United States Patent
Pham et al.

(10) Patent No.: US 9,440,509 B2
(45) Date of Patent: Sep. 13, 2016

(54) BATTERY COOLING APPARATUS

(71) Applicant: Ford Global Technologies, LLC, Dearborn, MI (US)

(72) Inventors: Thanh D. Pham, Canton, MI (US); Jesus Cardoso, Saline, MI (US); Beth Ann Dalrymple, Livonia, MI (US); Luis Lopez, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 14/045,897

(22) Filed: Oct. 4, 2013

(65) Prior Publication Data

US 2015/0096816 A1    Apr. 9, 2015

(51) Int. Cl.
| | |
|---|---|
| *B60K 11/06* | (2006.01) |
| *B60H 1/00* | (2006.01) |
| *H01M 10/613* | (2014.01) |
| *H01M 10/663* | (2014.01) |
| *H01M 10/625* | (2014.01) |
| *B60L 1/00* | (2006.01) |
| *B60L 1/02* | (2006.01) |
| *B60L 3/00* | (2006.01) |
| *B60L 11/18* | (2006.01) |

(52) U.S. Cl.
CPC ........... *B60H 1/00278* (2013.01); *B60L 1/003* (2013.01); *B60L 1/02* (2013.01); *B60L 3/003* (2013.01); *B60L 11/1816* (2013.01); *B60L 11/1874* (2013.01); *B60L 11/1875* (2013.01); *B60L 11/1877* (2013.01); *B60L 11/1879* (2013.01); *H01M 10/613* (2015.04); *H01M 10/625* (2015.04); *H01M 10/663* (2015.04); *B60H 2001/003* (2013.01); *B60L 2210/10* (2013.01); *B60L 2240/34* (2013.01); *B60L 2240/36* (2013.01); *B60L 2240/545* (2013.01)

(58) Field of Classification Search
CPC ................ B60K 2001/005; B60K 2001/0416; B60K 2001/0438
USPC ......................................................... 180/68.5
See application file for complete search history.

(56) References Cited

U.S. PATENT DOCUMENTS

| | | | | |
|---|---|---|---|---|
| 5,390,754 | A * | 2/1995 | Masuyama et al. | 180/68.5 |
| 7,240,752 | B2 * | 7/2007 | Takahashi et al. | 180/68.1 |
| 7,610,978 | B2 * | 11/2009 | Takasaki et al. | 180/68.5 |
| 7,637,335 | B2 * | 12/2009 | Hayashi | 180/68.5 |
| 7,678,494 | B2 * | 3/2010 | Tsuchiya | 429/120 |
| 7,688,582 | B2 * | 3/2010 | Fukazu et al. | 361/690 |
| 7,810,596 | B2 * | 10/2010 | Tsuchiya | 180/68.5 |
| 7,819,215 | B2 * | 10/2010 | Tsuchiya | 180/68.5 |
| 7,905,308 | B2 * | 3/2011 | Abe et al. | 180/68.5 |
| 8,177,008 | B2 * | 5/2012 | Yamamura et al. | 180/68.5 |
| 8,186,468 | B2 * | 5/2012 | Parrett et al. | 180/68.1 |
| 8,272,685 | B2 * | 9/2012 | Lucas et al. | 297/180.1 |
| 8,276,696 | B2 * | 10/2012 | Lucas | 180/68.2 |
| 8,430,194 | B2 * | 4/2013 | Yamatani | 180/68.1 |

(Continued)

*Primary Examiner* — Jeffrey J Restifo
(74) *Attorney, Agent, or Firm* — David B. Kelley; Brooks Kushman P.C.

(57) ABSTRACT

A vehicle includes a climate control system configured to regulate temperature within a cabin. The vehicle also includes a battery compartment disposed within the trunk, and a soft trim component that at least partially defines space within the trunk of the vehicle. The vehicle is further provided with a rigid insulative material formed upon and supporting a section of the soft trim such that the insulative material and section define a duct fluidly connecting the cabin and battery compartment in order to cool the battery compartment.

19 Claims, 6 Drawing Sheets

(56) References Cited

U.S. PATENT DOCUMENTS

| | | | |
|---|---|---|---|
| 8,567,543 B2* | 10/2013 | Kubota et al. | 180/68.5 |
| 8,668,037 B2* | 3/2014 | Shinde et al. | 180/68.5 |
| 8,720,625 B2* | 5/2014 | Yamamoto | 180/68.1 |
| 8,763,740 B2* | 7/2014 | Marcath et al. | 180/68.2 |
| 8,770,331 B2* | 7/2014 | Lim et al. | 180/68.5 |
| 2004/0065491 A1* | 4/2004 | Dudley et al. | 180/68.5 |
| 2005/0011692 A1* | 1/2005 | Takahashi et al. | 180/68.5 |
| 2005/0079336 A1* | 4/2005 | Dry et al. | 428/304.4 |
| 2013/0000864 A1* | 1/2013 | Yamatani | 165/59 |

\* cited by examiner

BATTERY COOLING APPARATUS

TECHNICAL FIELD

This disclosure relates to battery electric vehicles and the cooling of high-voltage batteries therein.

BACKGROUND

Electric vehicles and hybrid-electric vehicles generally have high-voltage batteries which are significantly larger than that of conventional internal combustion engine vehicles. The smaller batteries of internal combustion engine vehicles are commonly 12 to 14 volts to power the ignition system of a vehicle's engine as well as other low voltage electrical accessories. High-voltage traction batteries tend to be more susceptible to temperature rises during operation including electrical charging and discharging.

In passenger vehicles, the traction battery is commonly enclosed within a compartment of the vehicle. Typical compartments are not generally included in a climate controlled region within the vehicle. The temperature of such a compartment may be elevated by heat emitted from the battery, or by the external environment. Battery cooling efficiency may be reduced because airflow directed to the battery often undergoes a temperature increase prior to arriving at the battery due to the heat in the compartment in which it is enclosed.

SUMMARY

A vehicle includes a climate control system configured to regulate temperature within a cabin. The vehicle also includes a battery compartment disposed within the trunk, and a soft trim component that at least partially defines space within the trunk of the vehicle. The vehicle is further provided with a rigid insulative material formed upon and supporting a section of the soft trim such that the insulative material and section define a duct fluidly connecting the cabin and battery compartment in order to cool the battery compartment.

A high-voltage traction battery cooling apparatus is provided with a soft trim at least partially covering a battery assembly. The cooling apparatus further includes insulative material cooperating with the soft trim to define a duct connected to the battery assembly configured to direct air to the battery assembly.

A vehicle is provided with a passenger cabin, and a structural panel climatically separating the passenger cabin from a trunk and defining a first air ventilation port. The vehicle further includes a trim component at least partially defining a battery compartment within the trunk, where the battery compartment defines a second air ventilation port. Insulative material is integrally formed upon the trim component defining a duct and directs air from the passenger cabin to the battery compartment.

In certain configurations described herein, the trim may be a carpet made at least of a woven fabric.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
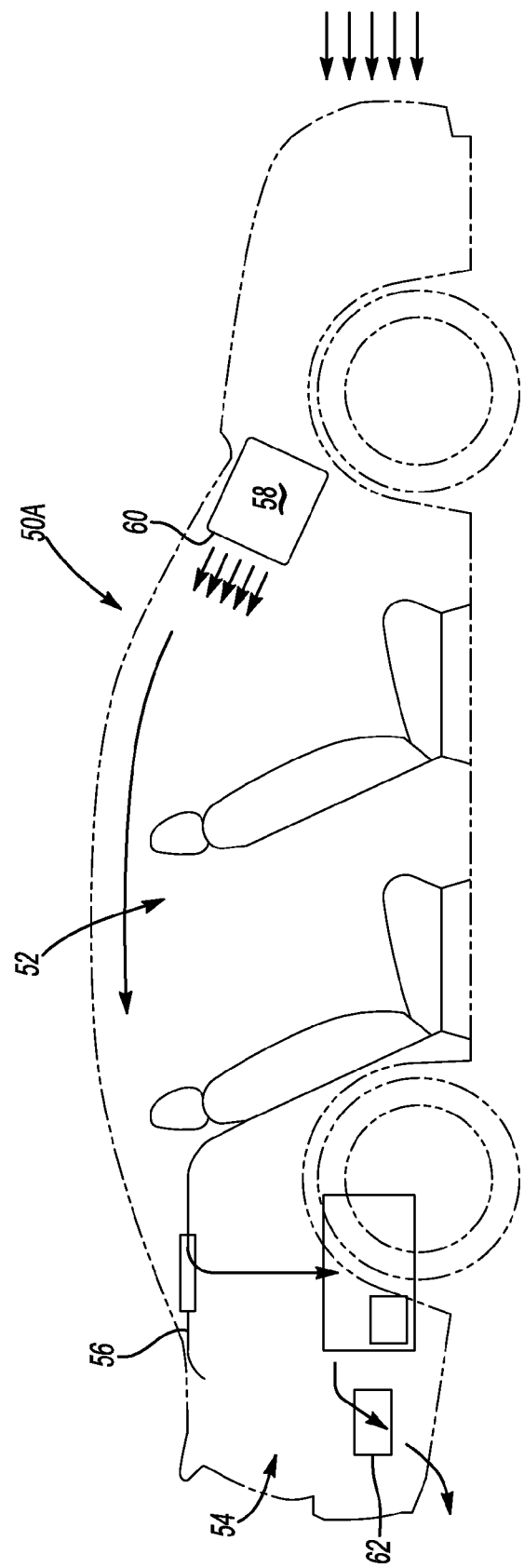
FIG. 1 depicts a side view schematic of a vehicle.

FIG. 1 depicts a schematic side view of a vehicle 50A having a passenger cabin 52, separated from a trunk 54 region. A structural panel, or package tray, 56 serves as an environmental barrier between the vehicle passenger cabin 52 and the trunk 54. Although the package tray 56 is not a complete sealing medium, it creates two environmentally distinct climate regions of the vehicle 50. In this way, the passenger cabin 52 may define an environment which is climatically separated from the trunk 54. Each area may have unique environmental properties such that the climate in each environment may be insulated from one another.

The vehicle 50A is also provided with a climate control system including a heating, ventilation, and air conditioning (HVAC) unit 58. The HVAC unit 58 controls the climate of the passenger cabin 52 by regulating the temperature and humidity of circulated air to enhance passenger comfort. Fresh air is taken in through the front of the vehicle 50A and blown about the passenger cabin 52 by blowers 60 of the HVAC unit 58. The air may be blown from a front area in a rearward direction, and circulate about the passenger cabin 52. Particularly in warm or humid external environments, an air conditioning operation of the HVAC unit 58 may be activated to blow cooled air about the passenger cabin 52. Bringing in fresh air from outside the vehicle may increase the air pressure in the passenger cabin 52, which may be allowed to exhaust from the vehicle through at least one air extractor 62. Although pressure may be allowed to pass from the passenger cabin to the trunk 54, the environmental barrier provided by the package tray 56, the air of the passenger cabin 52 is often at a lower temperature than the air of the trunk 54.

Figure 2:
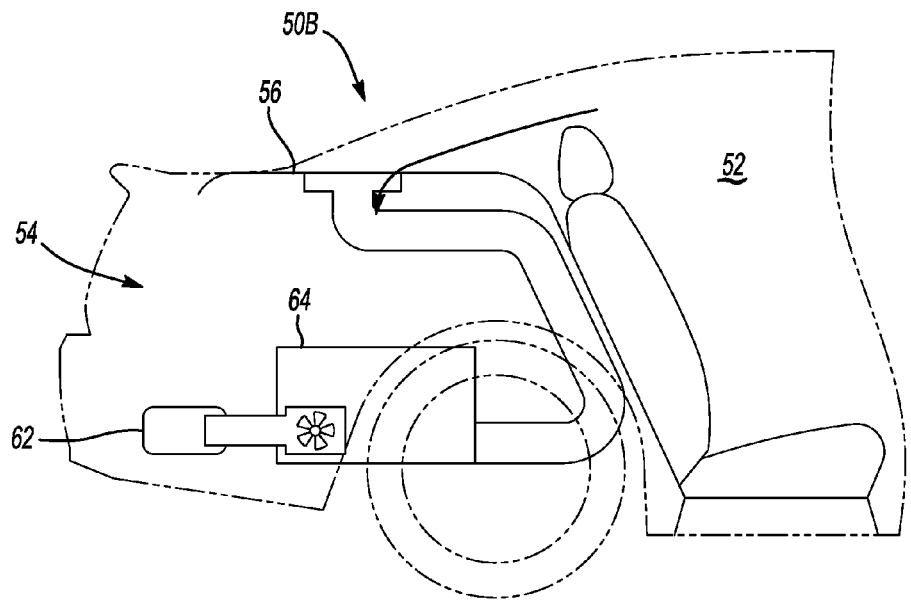
FIG. 2 depicts a side view schematic of a trunk region of a vehicle.

FIG. 2 depicts a schematic side view of a rear region of a vehicle 50B similar to that of FIG. 1, but with a battery cooling system. The vehicle 50B is provided with a high-voltage traction battery 64 disposed within the trunk 54. The depicted vehicle 50B represents a hybrid-electric vehicle having both a combustion and battery propulsion power source, a fully battery-electric vehicle having the traction battery 64 as its sole motive power, or any vehicle having a traction battery 64 to provide propulsion for the vehicle 50B. Although a hybrid-electric vehicle is discussed herein by way of example, other types of battery-electric vehicles are similarly provided with a high-voltage battery, and may benefit from embodiments of this disclosure. The term battery-electric vehicle generally refers to any such vehicle having a high-voltage battery. Related to operation of a high-voltage battery, the temperature in an area proximate to the battery may undergo a temperature increase caused by heat emitted from the battery. In at least one embodiment, the high-voltage traction battery assembly 64 is disposed in within the trunk 54 of the vehicle 50.

Figure 3:
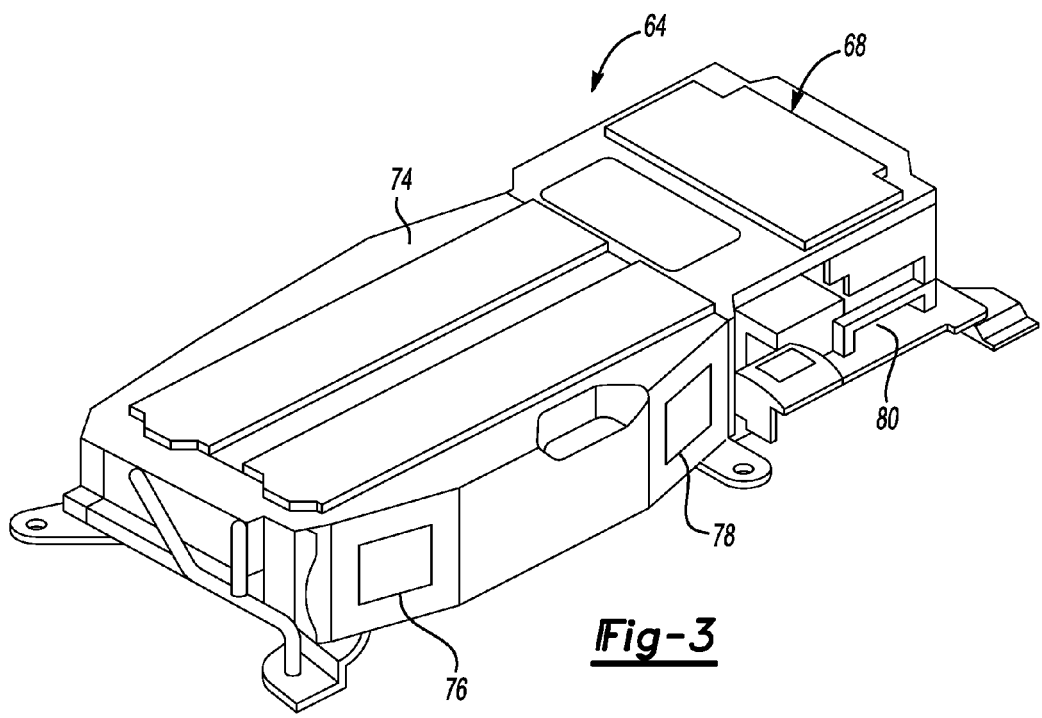
FIG. 3 is a front perspective view of a battery assembly.

Referring to FIG. 3, an illustrative battery assembly 64 is shown. The battery assembly 64 may be an assembly comprising several components such as a body electrical control module (BECM), and a DC/DC converter module 68 having an internal DC/DC converter unit. The battery assembly 64 may further include internal cell arrays to store, as well as provide energy to operate a vehicle traction motor and other systems of vehicle 50. The battery cell arrays may be in electrical communication with the BECM, DC/DC converter unit, as well as other vehicle components. The BECM may in turn generate appropriate control signals in response to input signals from various control systems. These control signals may serve to activate and/or deactivate the various vehicle components and draw current from the battery assembly 64. The DC/DC converter module 68 may convert high-voltage from the battery cells into low voltage for use by the vehicle components and systems. The battery cells may also be recharged by a connection to an external power source or by power provided from an on-vehicle electric generator. Each of the aforementioned operations may cause the emission of heat from the battery assembly 64 when performed.

Different battery configurations may also be available to address individual vehicle variables including packaging constraints and power requirements. The battery assembly 64 may further be heated and/or cooled by a thermal management system to assist with maintaining a desired operating temperature range. Some examples of thermal management systems include air cooling systems, liquid cooling systems, and a combination of air and liquid systems. In at least one embodiment, an air cooling system is provided with a combination of one or more powered blowers, fans, and ducts. The cooling system distributes air across the components of the battery assembly 64, including the DC/DC converter module 68 and the internal battery cells in order to aid in the dissipation of heat generated during vehicle operations.

Still referring to FIG. 3, the battery assembly 64 includes a battery module cover 74 which may at least partially define a battery compartment to house the internal battery components. The battery cover 74 may further define inlet ports 76 and 78. In at least one embodiment, the battery assembly inlet ports 76, 78 are oriented to direct airflow across the battery components. In certain further embodiments, the inlet ports 76, 78 may be arranged obliquely and/or at an angle relative to the battery assembly 64 to enhance air circulation within the battery assembly 64. Additionally, there may be a dedicated DC/DC converter inlet port 80 to allow air to route directly to the DC/DC converter module 68.

Figure 4:
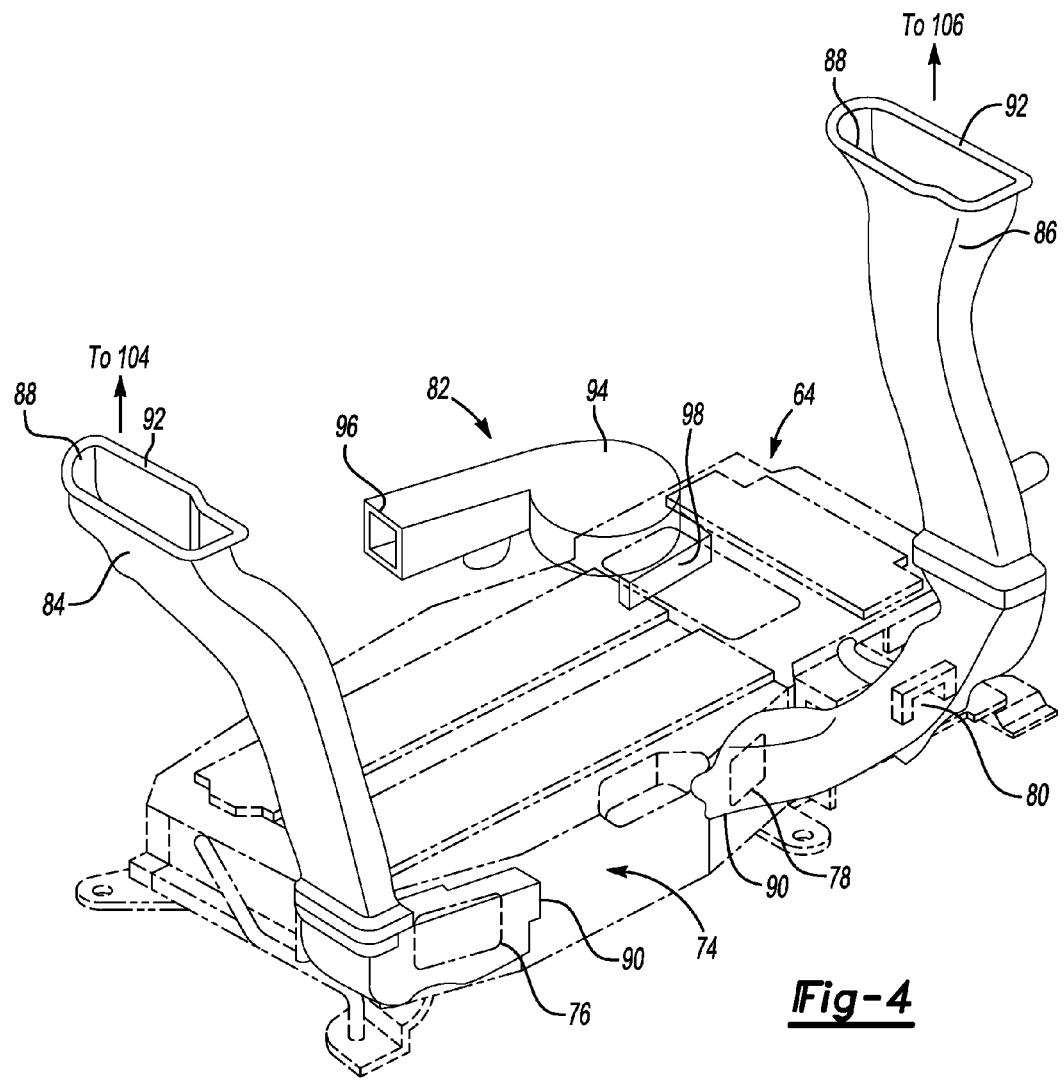
FIG. 4 is a front perspective view of an air cooling system in cooperation with the battery assembly of FIG. 3.

FIG. 4 depicts an embodiment of a cooling system 82 in cooperation with the battery of FIG. 4 where at least one duct is provided in fluid connection with the battery assembly 64. Both of a first and a second airflow duct 84, 86 each define airflow inlet and outlet ports 88, 90. The airflow outlet ports 90 of the first and second airflow ducts 84, 86 may be fluidly connected to battery assembly inlet ports 76 and 78 respectively. The airflow outlet port 90 of the second airflow duct 86 may additionally be fluidly connected to the DC/DC converter inlet port 80. The airflow ducts 84, 86 may additionally define conduit walls 92 to contain and enhance airflow through an internal portion of the ducts 84, 86. It is contemplated that the polypropylene ducts may comprise closed sections having tubular portions. Additionally, as well as alternatively, the duct may include open partial sections supplemented by other nearby components. In further embodiments, the outlet ports of the ducts may be proximate to, but not connected to the structure of the battery.

In at least one embodiment, the cooling system 82 is also provided with a blower unit 94. The blower unit 94 may include a powered fan, as well as an exhaust port 96 to direct air after being circulated through the battery cooling system 82. The blower unit 94 may be positioned downstream in the direction of airflow relative to the internal battery cells and the DC/DC converter unit 68. In this way, when the blower unit 94 is activated in a first direction of airflow, it may bias directional airflow through the first and second ducts 84, 86 and across the battery assembly 64 to provide a cooling effect. The blower unit 94 may be positioned near a battery cover exhaust 98 to pull airflow through the battery assembly 64. The blower unit 94 may further be configured such that the exhaust port 96 is positioned proximate to a vehicle air extractor 62 so as to purge air from the vehicle 50. It is contemplated that the blower may be placed at different locations in the airflow path and still operate to direct air across the battery.

Figure 5:
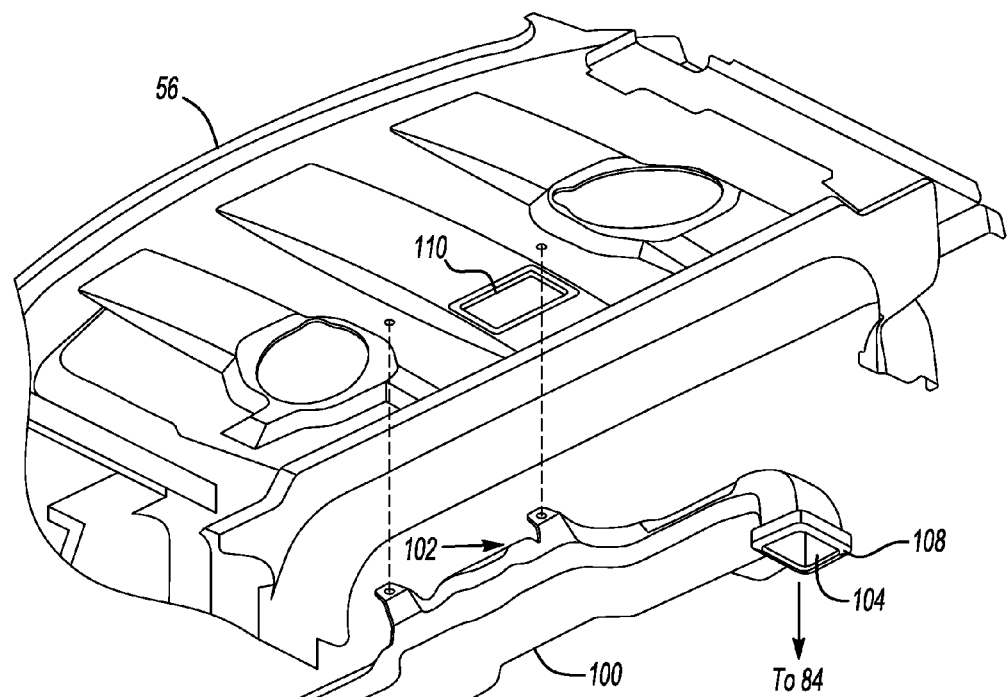
FIG. 5 is a rear perspective installation view of an upper portion of a duct system installation path.

Referring to FIG. 5, the cooling system 82 may further be provided with an upper duct extension 100 to cooperate with the ducts depicted in FIG. 4. The upper duct extension 100 may be configured to provide a fluid connection between the structural package tray 56 and each of the inlet ports 88 of the first and second airflow ducts 84, 86. The upper duct extension may have a single inlet port 102, and first and second outlet ports 104, 106 configured to correspond to the inlet ports 88 of the first and second airflow ducts 84, 86. The upper duct extension 100 also defines a conduit wall 108 to contain and enhance airflow through an internal portion of the extension 100.

The connection of the first and second airflow ducts 84, 86 with the upper duct extension 100 according to disclosed embodiments provides a dual air path battery cooling system. The two paths are disposed on laterally opposing sides of the vehicle 50. In this way the ducts may be routed such that they are shaped to conform to an outer perimeter of the trunk 54. This duct routing configuration helps to optimize available trunk storage space. Additionally, having two spaced apart outlet port locations for air to enter the battery assembly 64 may provide for enhanced distribution of cool airflow about the battery components.

An air ventilation port 110 is provided on the package tray 56, and may serve as a fluid passage for air to enter into the trunk 54 from the passenger cabin 52. In at least one embodiment, the air ventilation port 110 is substantially centered on the package tray 56 across a lateral span of vehicle 50. A substantially centered position of the air ventilation port 110 may enhance the receipt of circulating air from the passenger cabin 52.

As discussed above, the trunk 54 often has a higher temperature of air in relation to the passenger cabin 52. It is desirable to minimize any increase in air temperature as the air travels through the various ducts approaching the battery assembly 64. Minimizing air temperature changes may enhance overall system efficiency by reducing demands on the vehicle HVAC system, as well as demands on any blowers located near the battery cooling system. Lower speed of blower operation not only reduces the energy draw required to cool the battery assembly 64, but also reduces the noise associated with operating the blowers at higher speeds.

In at least one embodiment, when the inlet air temperature is 25 degrees C., the increase in air temperature between the inlet and outlet ports of the ducts is no more than 5 degrees C. due to the surrounding temperature outside the ducts.

The first and second airflow ducts 84, 86 and/or the upper duct extension 100 may each be formed from a material having high insulative properties. High stiffness expanded polypropylene (EPP), or ethylene propylene diene monomer (EPDM) rubber are examples of suitable insulation materials by which to form the conduit walls of one or more of the ducts. Either of the aforementioned exemplary materials may be provided with air pockets, or "foamed," to reduce weight while maintaining insulative properties. Also, by specifying particular wall thicknesses of the conduit walls 92, 108 of the various ducts, the insulation properties of the ducts may be further enhanced. Sufficient wall thickness can in turn help to ensure an overall target efficiency of the battery cooling system. For example, where the conduit walls are formed from a rigid foamed EPP material, it may be desirable to have a wall thickness of at least 6.35 mm. Similarly, in alternative embodiments where the conduit walls are formed from an EPDM material, a wall thickness of greater than 12 mm may be desirable to achieve similar insulative properties.

Alternatively, it may be desirable to specify a target thermal insulation R-value of the ducts and/or the battery cooling system. Using this approach, an array of materials may be evaluated having alternative wall thicknesses of the conduit walls so as to achieve a desired cooling efficiency. In at least one embodiment, the conduit walls of the ducts of have a thermal insulation R-value of at least 4 K·m²/W to ensure desired system performance.

Figure 6:
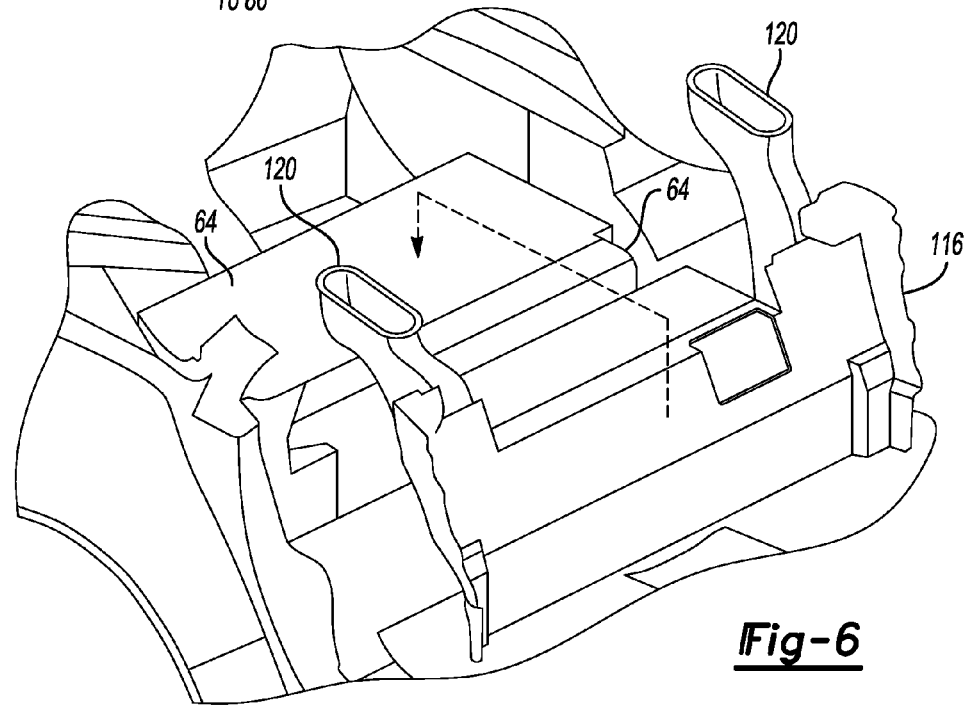
FIG. 6 is a front perspective cutaway view of a trim cover cooling system installation path.
Figure 7:
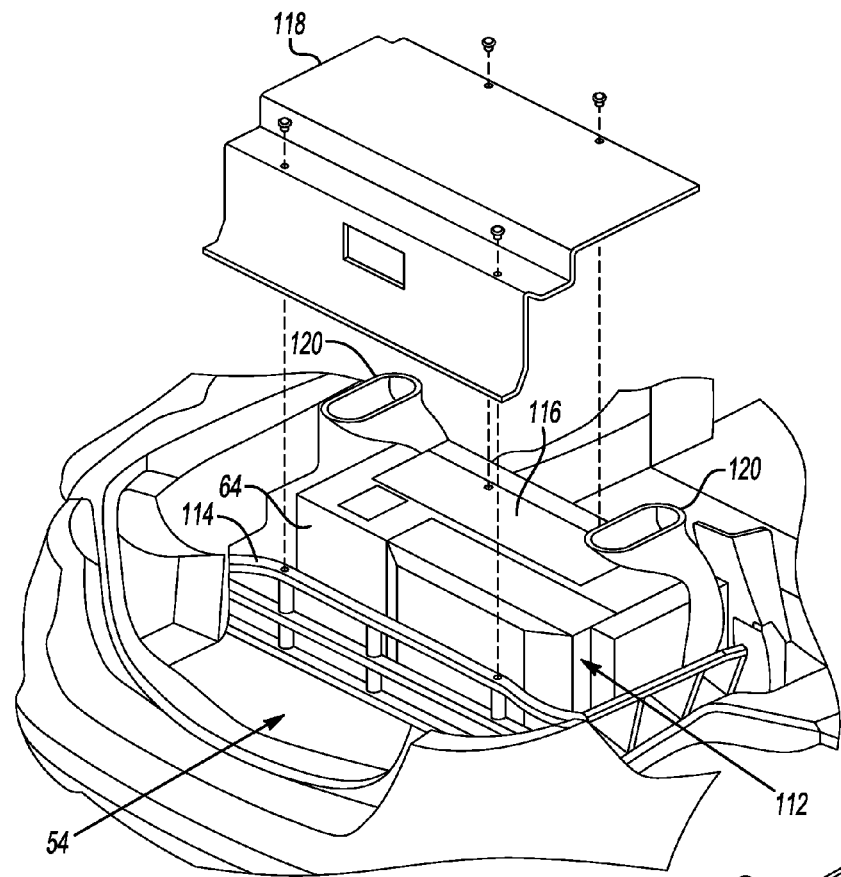
FIG. 7 is a rear perspective cutaway view of a rear trim panel installation path.

Vehicle trim components in the areas surrounding the battery assembly 64 may be utilized to further assist in managing thermal conditions of the battery. Referring to FIGS. 6 and 7, a battery compartment 112 is defined about the battery assembly 64 by the combination of a battery cage structure 114, and at least a first trim component 118 configured to at least partially conceal the battery assembly 64. A second trim component 116 is additionally provided to include an insulated duct. The first and second trim components 118, 116 may be soft trim components. The trim covers are capable of providing an aesthetic interface to a vehicle user, and may include flexible unsupported portions, such as a carpet trim. In such situations, the carpet trim component may be made in part of a woven fabric material.

At least one of the trim cover panels may be provided with at least one rigid integral duct 120. The duct 120 may provide stiffness to a flexible portion of one or more trim components and thereby operate as a structural support member. The trim covers also cooperate to both shield and house the battery assembly 64. The duct 120 may further comprise a pair of ducts fluidly connectable to the battery assembly 64 on laterally opposing sides of the vehicle. Each of the pair of ducts defines an internal passage in fluid connection with the passenger cabin where an outlet directs air to the battery assembly 64 similar to previously discussed embodiments. Although an overlap of the rear trim cover 118 over the forward trim cover 116 is depicted, it is contemplated that alternative overlapping configurations may be desirable at least related to the assembly and appearance of the space internal to the trunk 54.

Figure 8:
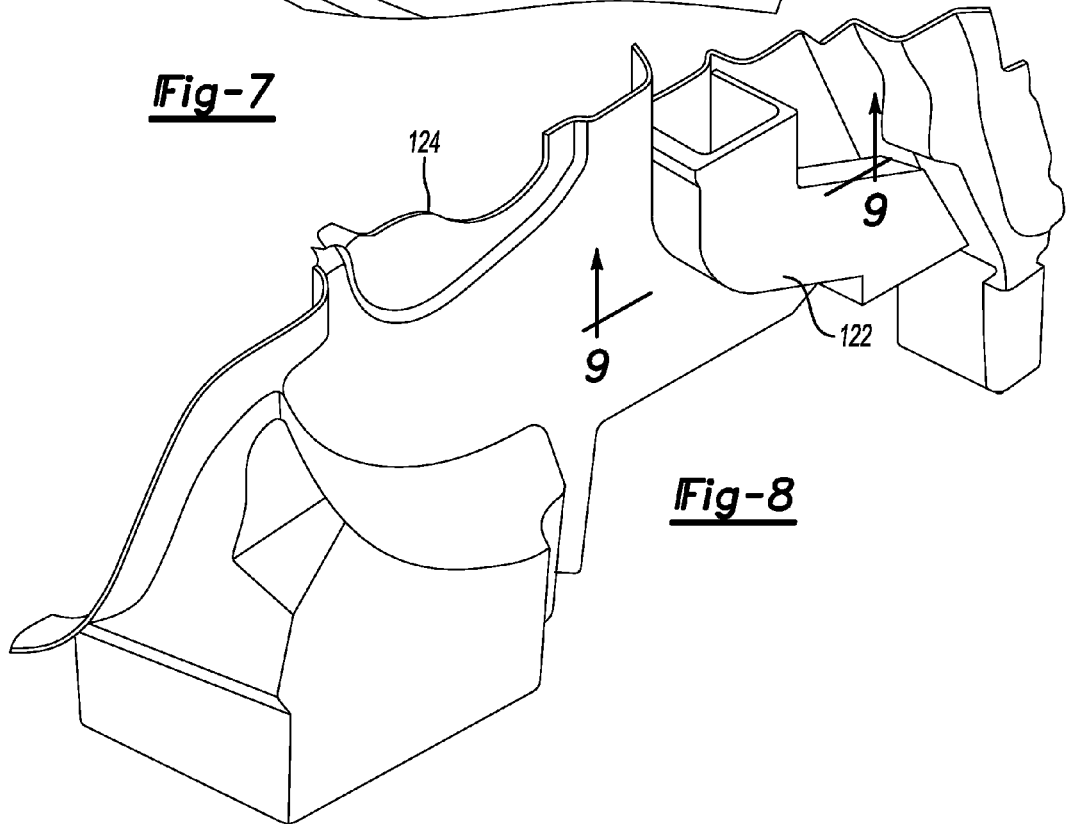
FIG. 8 is a rear perspective view of an underside of a side trim.
Figure 9:
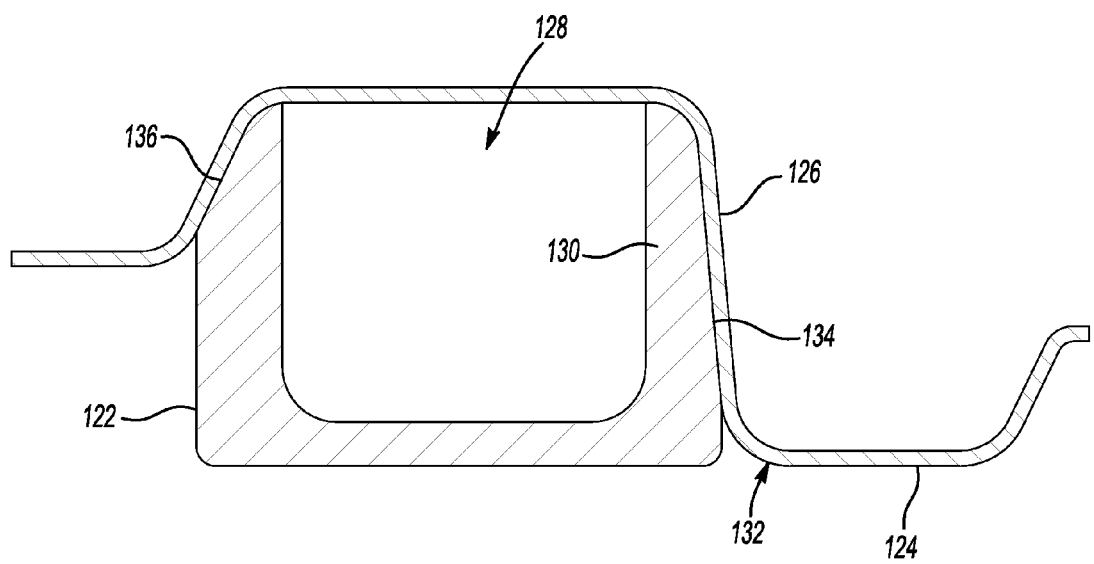
FIG. 9 is a cross-sectional view of the side trim of FIG. 8.

In further embodiments, the first and/or second airflow ducts may be provided as an integral member of a side trim panel. FIGS. 8 and 9 depict such integration of an insulated duct 122 into a side trim component. By way of example, the insulated duct 122 is over-molded about a side carpet trim 124 using a rigid structural foam material, where the duct 122 comprises an open U-shaped cross-section. The configuration of the section is such that an integral wall 126 of the carpet trim 124 supplements the section to close off an open portion 128 of the structural foam material. The carpet trim 124 generally has flexible portions, so the use of a rigid foam duct 122 adds to the stiffness of the carpet trim 124, and the duct 122 may operate as a structural member to provide backing and support the carpet trim 124. This approach may save material costs and weight by utilizing the surface of the underside of the carpet trim 124 to complete a closed conduit section of a duct. Further, the integration of parts may reduce assembly costs, as well as reduce the risk of buzz, squeak, or rattle related to the duct contacting the underside of the trim under vibrating vehicle operating conditions.

FIG. 9 shows cross sectional view cut through the embodiment of FIG. 8. As can be seen from the cross section, at least one side wall 130 of the duct 122 may be collinear with an underside portion 132 of the carpet trim 124. This provides for a first bonding area 134 for the over-molded duct 122. At least on additional bonding area 136 may also be provided such that the duct 122 is firmly adhered to the underside 132 of the carpet trim 124.

A further advantage of embodiments disclosed herein is the optimization of cargo package space. In disclosed embodiments, the pair of ducts span to opposing lateral sides of the trunk of the vehicle, conforming to outer portions of the trunk. Additionally, each duct rejoins at an upper portion of the trunk and connects to the structural package tray through an air ventilation port at a substantially centered location in the vehicle. Such a centered location is advantageous to receive through the air ventilation port, conditioned air circulated from the passenger cabin.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
 a climate control system configured to regulate temperature within a cabin;
 a flexible trim layer at least partially defining a trunk in the vehicle separate from the cabin;
 a battery compartment disposed in the trunk; and a rigid insulative material formed upon and supporting a section of the trim layer such that the insulative material and section define an elongated U-shaped duct fluidly connecting the cabin and battery compartment.

2. The vehicle of claim 1 wherein the flexible trim layer comprises a woven fabric.

3. The vehicle of claim 1 wherein the flexible trim layer is a carpet.

4. The vehicle of claim 1 wherein a portion of the duct is formed by an integral wall of the flexible trim layer.

5. The vehicle of claim 1 wherein the duct includes airflow inlet and outlet ports and wherein the insulative material has a thermal insulation value such that an increase in air temperature between the inlet and outlet ports is no more than 5 degrees C. when an inlet air temperature is 25 degrees C.

6. The vehicle of claim 1 wherein the insulative material has an R-value of at least 4 K·m$^2$/W.

7. The vehicle of claim 1 wherein the insulative material is expanded polypropylene (EPP) having a thickness of at least 6 mm.

8. The vehicle of claim 1 further comprising a tray climatically separating the cabin from the trunk, and defining an air ventilation port connecting the cabin and duct.

9. A high-voltage traction battery cooling apparatus comprising:
   a flexible trim layer at least partially covering a battery assembly; and
   insulative material formed upon the trim layer, wherein each of the insulative material and the trim layer define a portion of a U-shaped cross-section of an elongated duct fluidly connecting a vehicle cabin and the battery assembly and configured to direct air to the battery assembly.

10. The cooling apparatus of claim 9 wherein the insulative material has an R-value of at least 4 K·m$^2$/W.

11. The cooling apparatus of claim 9 wherein the trim layer comprises a woven fabric.

12. The cooling apparatus of claim 9 wherein a portion of the duct is formed by an integral wall of the trim layer.

13. The cooling apparatus of claim 9 wherein the duct includes airflow inlet and outlet ports and wherein the insulative material has a thermal insulation value such that an increase in air temperature between the inlet and outlet ports is no more than 5 degrees C. when an inlet air temperature is 25 degrees C.

14. The cooling apparatus of claim 9 wherein the insulative material is expanded polypropylene (EPP) having a thickness of at least 6 mm.

15. A vehicle comprising:
   a passenger cabin;
   a panel climatically separating the passenger cabin from a trunk and defining a first air ventilation port;
   a trim component at least partially defining a battery compartment within the trunk, the battery compartment defining a second air ventilation port; and
   insulative material integrally formed upon the trim component, wherein each of the insulative material and the trim component define a portion of a U-shaped cross-section of an elongated duct to direct air from the passenger cabin to the battery compartment.

16. The vehicle of claim 15 wherein the insulative material has an R-value of at least 4 K·m$^2$/W.

17. The vehicle of claim 15 wherein the insulative material is over-molded upon the trim component.

18. The vehicle of claim 15 wherein the trim component comprises a woven fabric carpet and the insulative material is arranged to support the carpet.

19. The vehicle of claim 15 wherein the insulative material is expanded polypropylene (EPP) having a thickness of at least 6 mm.

* * * * *